US009211519B2

(12) United States Patent
Little et al.

(10) Patent No.: US 9,211,519 B2
(45) Date of Patent: Dec. 15, 2015

(54) METHODS TO PREPARE PATCHY MICROPARTICLES

(75) Inventors: Steven R. Little, Allison Park, PA (US); Kaladhar Kamalasanan, Pittsburgh, PA (US)

(73) Assignee: University of Pittsburgh-of the Commonwealth System of Higher Education, Pittsburgh, PA (US)

( * ) Notice: Subject to any disclaimer, the term of this patent is extended or adjusted under 35 U.S.C. 154(b) by 155 days.

(21) Appl. No.: 13/500,890

(22) PCT Filed: Oct. 7, 2010

(86) PCT No.: PCT/US2010/051771
§ 371 (c)(1),
(2), (4) Date: Apr. 6, 2012

(87) PCT Pub. No.: WO2011/044328
PCT Pub. Date: Apr. 14, 2011

(65) Prior Publication Data
US 2012/0214001 A1   Aug. 23, 2012

Related U.S. Application Data

(60) Provisional application No. 61/249,802, filed on Oct. 8, 2009.

(51) Int. Cl.
*B01J 13/18* (2006.01)
(52) U.S. Cl.
CPC ............ *B01J 13/18* (2013.01); *Y10T 428/2982* (2015.01); *Y10T 428/2991* (2015.01)
(58) Field of Classification Search
CPC ............... B01J 13/18; Y10T 428/2991; Y10T 428/2982
USPC ........................................................ 427/212
See application file for complete search history.

(56) References Cited

U.S. PATENT DOCUMENTS

| 4,123,396 A | 10/1978 | Rembaum et al. |
| 4,452,773 A | 6/1984 | Molday |

(Continued)

FOREIGN PATENT DOCUMENTS

| WO | WO 2007024323 | * | 3/2007 | ............. G06F 15/16 |
| WO | WO 2008115550 | * | 9/2008 | ............. C04B 41/50 |

OTHER PUBLICATIONS

Li, Conjugation of Colloidal Clusters and Chains by Capillary Condensation, JACS, 2009, 131, p. 9920-9921 and Supporting Information, p. S1-S-7.*

(Continued)

*Primary Examiner* — Tabatha Penny
(74) *Attorney, Agent, or Firm* — Klarquist Sparkman, LLP

(57) ABSTRACT

A method for making microparticles having an exterior surface that includes preparing a self-assembled arrangement of microparticles; contacting the self-assembled microparticles with a patch-forming agent resulting in a microparticle/patch-forming agent assembly having proximal regions between adjacent microparticles and/or proximal regions between a microparticle and another substrate, wherein the patch-forming agent is present in the proximal region; and condensing the patch-forming agent such that a pattern of a plurality of discrete patches of patch-forming agent are formed on the exterior surfaces of the microparticles at the proximal regions. A synthetic microsphere having an exterior spherical surface, wherein the exterior spherical surface comprises a first material and a plurality of discrete, uniformly-dimensioned, patches of a second bioactive material arranged in an orderly array over more than one hemisphere of the microsphere.

28 Claims, 14 Drawing Sheets

(56) References Cited

U.S. PATENT DOCUMENTS

| | | | |
|---|---|---|---|
| 4,624,923 | A | 11/1986 | Margel |
| 5,169,754 | A | 12/1992 | Siiman et al. |
| 5,514,430 | A | 5/1996 | Andersen et al. |
| 5,552,086 | A | 9/1996 | Siiman et al. |
| 6,248,268 | B1 | 6/2001 | Cook |
| 6,998,228 | B2 | 2/2006 | Henderson et al. |
| 7,491,491 | B2 | 2/2009 | Arnold et al. |
| 7,501,134 | B2 | 3/2009 | O'Hagan et al. |
| 7,694,471 | B2 | 4/2010 | Meeks et al. |
| 2004/0084142 | A1 | 5/2004 | Usui |
| 2008/0234394 | A1* | 9/2008 | Hong et al. ............ 516/22 |

OTHER PUBLICATIONS

Suci, A Streptavidin-Protein Cage Janus Particle for Polarized Targeting and Modular Functionalization, JACS, 2009, 131, p. 9164-9165.*

Kim et al., Photocurable Pickering Emulsion for Colloidal Particles with Structural Complexity, Langmuir 2008, 24, p. 2365-2371.*

Vakarelski, Assembly of Gold Nanoparticles into Microwire Networks Induced by Drying Liquid Bridges, Physical Review Letters 102, Feb. 6, 2009, p. 058303-1 to 058303-4.*

Ko, Effects of Liquid Bridge between Colloidal Spheres and Evaporation Temperature on Fabrication of Colloidal Multilayers, J Phys. Chem. B 2007, 111, p. 1545-1551.*

Glotzer & Solomon, "Anisotrophy of building blocks and their assembly into complex structures," *Nature Materials* 6:557-562, Aug. 2007.

Perro et al., "Design and synthesis of Janus micro- and nanoparticles," *Journal of Materials Chemistry* 15:3745-3760, 2005 (Available online Jul. 25, 2005).

Roh et al., "Biphasic Janus particles with nanoscale anisotropy," *Nature Materials* 4(10):759-763, 2005 (Available online Sep. 25, 2005) (Abstract only).

Snyder et al., "Nanoscale Functionalization and Site-Specific Assembly of Colloids by Particle Lithography," *Langmuir* 21:4813-4815, 2005 (Available online Apr. 23, 2005).

Yuet et al., "Multifunctional Superparamagnetic Janus Particles," *Langmuir* 26(6):4281-4287, 2010 (Abstract only).

Zhang et al., "Patterning Microsphere Surfaces by Templating Colloidal Crystals," *Nano Letters* 5(1):143-146, 2005 (Available online Dec. 4, 2004).

International Search Report and Written Opinion of the International Searching Authority for PCT Application No. PCT/US2010/051771, dated Jun. 24, 2011.

* cited by examiner

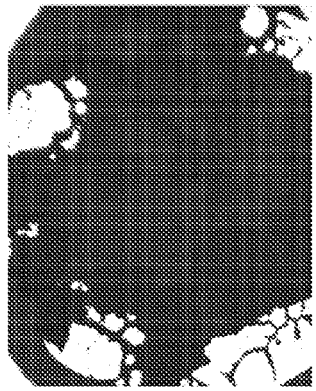
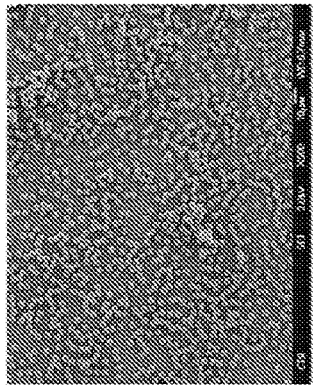
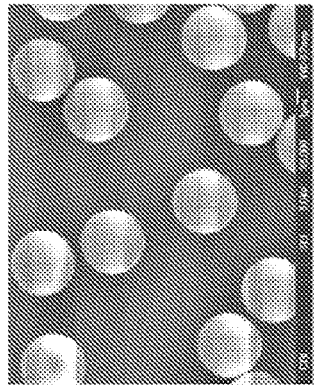
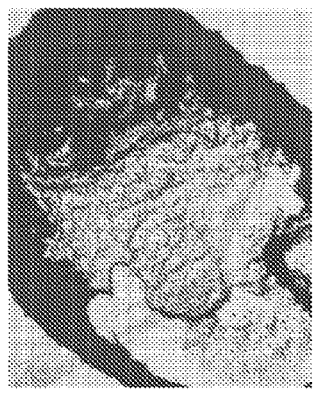
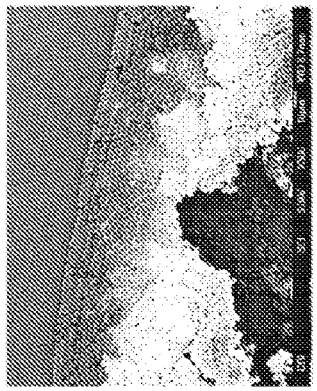
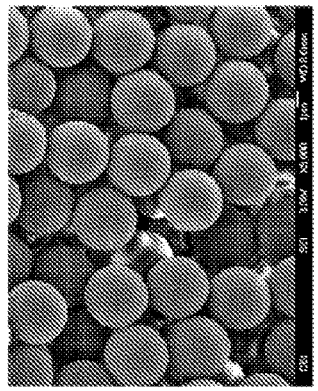
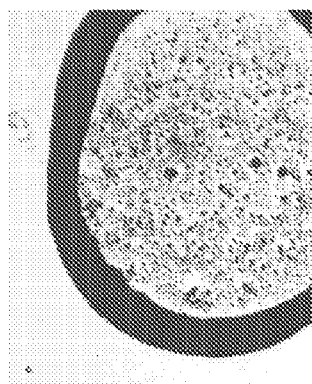
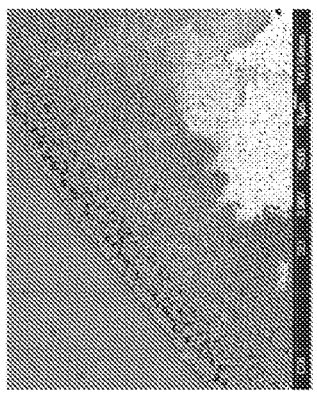
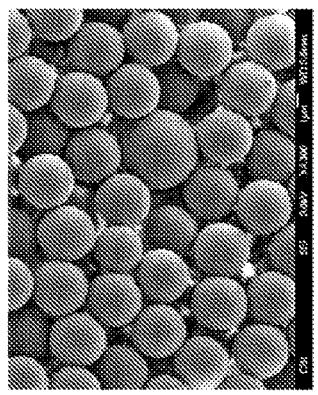
FIG. 2A
FIG. 2B
FIG. 2C

FIG. 7

Theory

Microsphere Self-Assembly[3]:

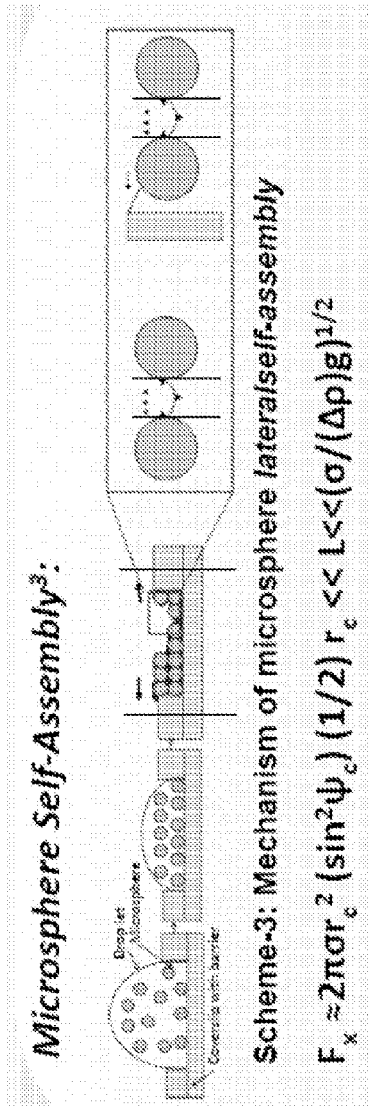

Scheme-3: Mechanism of microsphere lateral self-assembly $$F_x \approx 2\pi\sigma r_c^2 (\sin^2\psi_c)(1/2) r_c \ll L \ll (\sigma/(\Delta\rho)g)^{1/2}$$

Where, $\sigma$ is the surface tension of the liquid, $r_c$ is the radius of the three phase contact line at the particle surface, $\psi_c$ is the mean meniscus slope angle at the contact line, $g$ is the gravitational acceleration, and $\Delta\rho$ is the difference in mass densities of the liquid.

PDMS condensation (liquid to solid) at contact points:

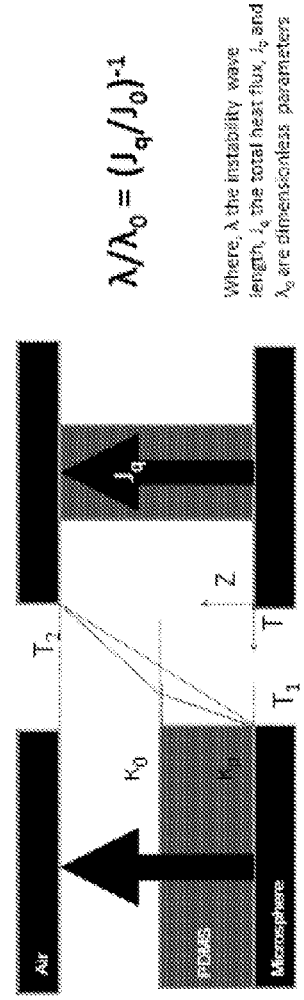

$$\lambda/\lambda_0 = (J_q/J_0)^{-1}$$

Where, $\lambda$ the instability wave length, $J_q$ the total heat flux, $J_0$ and $\lambda_0$ are dimensionless parameters Scheme-4: Mechanism of dewetting induced nanopatterning[4]

FIG. 9A
FIG. 9B
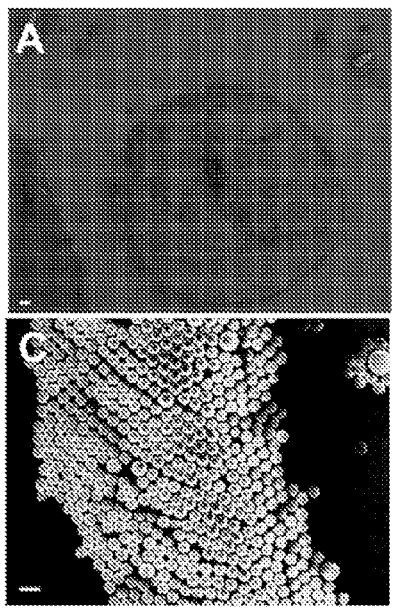
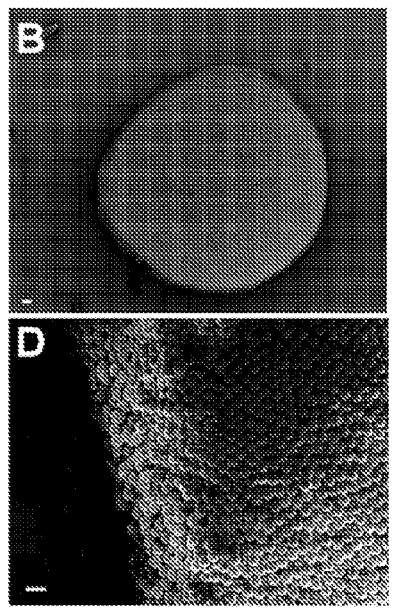
FIG. 9C
FIG. 9D

Packing
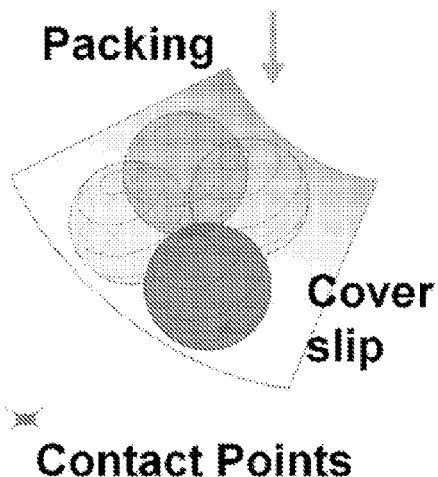
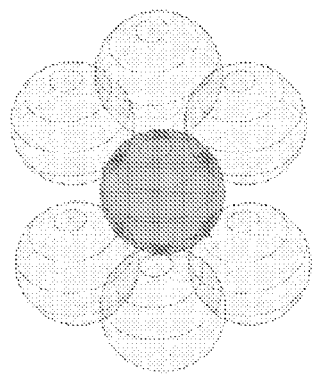
Cover slip
Contact Points

METHODS TO PREPARE PATCHY MICROPARTICLES

CROSS REFERENCE TO RELATED APPLICATIONS

This is the U.S. National Stage of International Application No. PCT/US2010/051771, filed Oct. 7, 2010, which was published in English under PCT Article 21(2), which in turn claims the benefit of U.S. Provisional Application No. 61/249,802, filed Oct. 8, 2009. The provisional application is incorporated herein in its entirety.

BACKGROUND

Microspheres with regular and ordered surface patterns (patches) have tremendous potential for usage in sensor, biomedical and photonic applications. However a method for the easy patterning of the microsphere surface, post pattern functionalization and the easy recovery of the microspheres is not currently available.

Several attempts to synthesize patchy microspheres have been explored. Further, more complex methods have been used to reduce the size of the patches (from Janus to discrete patches separated by some distance). However, these procedures have thus far only patterned one of the particle hemispheres. Furthermore, most of these techniques (including ones that can affect the entire particle surface) are not suitable for post pattern functionalization using soft structures like proteins or polymers.

Recently, Wang et al., Angew. Chem. Int. Ed. 2008, 47, 4725-4728, has reported self-assembly mediated packing of the microparticles. They were further annealed at the contact points to generate non-spherical particles. The major disadvantage with this approach is that the surface chemistry at the contact point is altered due to annealing. On the other hand Snyder, C. E.; Yake, A. M.; Feick, J. D.; Velegol, D. Langmuir 2005, 21, 4813-4815 proposed a more robust technique, based on "microparticle lithography". The disadvantage with this technique is that it can be done only in batches and the formed patterns are not in a regular order. Scaffolding and treatments in microfluidic chamber are possible alternatives. However, special care will need to be taken in recovery of the particles with high surface fidelity.

SUMMARY

One embodiment disclosed herein involves a method for making microparticles having an exterior surface, comprising:
preparing a self-assembled arrangement of microparticles;
contacting the self-assembled microparticles with a patch-forming agent resulting in a microparticle/patch-forming agent assembly having proximal regions between adjacent microparticles and/or proximal regions between a microparticle and another substrate, wherein the patch-forming agent is present in the proximal regions; and
condensing the patch-forming agent such that a pattern of a plurality of discrete patches of patch-forming agent are formed on the exterior surfaces of the microparticles at the proximal regions.

Also disclosed herein is a method of functionalizing particles, comprising:
a. arranging particles in a two- or three-dimensional pattern;
b. contacting the particles with a solvent comprising a polymer to produce a polymer mixture; and
c. dewetting the polymer mixture to produce functionalized particles having patches of the polymer on their surface.

A further embodiment disclosed herein is a synthetic microsphere having an exterior spherical surface, wherein the exterior spherical surface comprises a first material and a plurality of discrete, uniformly-dimensioned, patches of a second material (the second material may be a bioactive material) arranged in an orderly array over more than one hemisphere of the microsphere.

In an additional embodiment there is provided a composition comprising a scaffold that includes a self-assembled arrangement of microparticles and a patch-forming agent that is disposed only at proximal regions between adjacent microparticles and is not disposed in interstitial spaces between the microparticles.

In a further embodiment there is provided a composition comprising a scaffold that includes a self-assembled arrangement of microparticles and a patch-forming agent that is disposed at proximal regions between adjacent microparticles and in interstitial spaces between the microparticles, wherein the patch-forming agent is only bound to surface regions of the microparticles that are contiguous to proximal regions and the patch-forming agent is not bound to surface regions of the microparticles that are contiguous to the interstitial spaces.

The foregoing will become more apparent from the following detailed description, which proceeds with reference to the accompanying figures.

BRIEF DESCRIPTION OF THE DRAWINGS

FIG. 2 demonstrates the effect of solvent in the microparticle self-assembly process. The first row (FIG. 2A) is optical microscopy of a drop of microparticles when dried. The second and third rows (FIGS. 2B and 2C) are SEM images of microparticles on glass cover slips. Column, when solvent is Water ($1^{st}$ column), Ethanol ($2^{nd}$ column), Propylene glycol ($3^{rd}$ column). FIG. 2B, particle self assembly; FIG. 2C, interconnection between the particles.

FIG. 7 depicts demonstrates microsphere self-assembly and PDMS condensation.

DETAILED DESCRIPTION

General Process

Disclosed herein is a robust and feasible procedure to develop regular and ordered patches onto microparticles, especially microspheres. The patterns formed on these microparticles are a heterogeneous phase of condensed molecules. These patches can be either used as a protective mask or a site for further (e.g., post patterning) functionalization. These techniques can be utilized for various kinds of microspheres (polymer, mineral and metallic), and patches (polymer, small molecules, metal and mineral) with different sizes (by changing the neighboring microspheres around a single particle), and number (by varying the crystalline packing). The process is less energy and time consuming with higher precision when compared to other lithographic techniques. The pattern formation is due to newly observed phenomena of capillary condensation of molecules in the proximal regions between adjacent microparticles.

The patch-forming methods disclosed herein are based on a contact or proximal location-mediated condensation process. In particular, when two or more microparticles (e.g., microspheres) (or a microparticle and another substrate such as a substrate with a flat surface) are very close to (or in physical contact) each other in a liquid or fluid suspension containing the patch-forming agent (which is chemically and/or physically distinct from the microparticle composition) the proximal region between the microparticles (or microparticles and another substrate) will be occupied by the liquid. Upon solidification of the microparticle/liquid assembly, patches of the patch-forming agent form via condensation at the proximal regions. In certain embodiments, the condensation can occur only at the proximal region (e.g. in the PDMS embodiment described below in more detail) and/or the region of the microparticle surface where the thinnest liquid layer migrates and dries at the last stage of solidification.

The liquid from the interstitial space (the region other than the proximal region) has a minimal role in the patch-forming process and can be removed. For example, the interstitial space liquid can be drained off such as, for example, in an embodiment wherein the patch-forming composition is a salt solution. In another embodiment, the interstitial space liquid forms a visco-elastic material (e.g. polydimethylsiloxane (PDMS)) which dewets from the exterior surface of microparticles.

Figure 4:
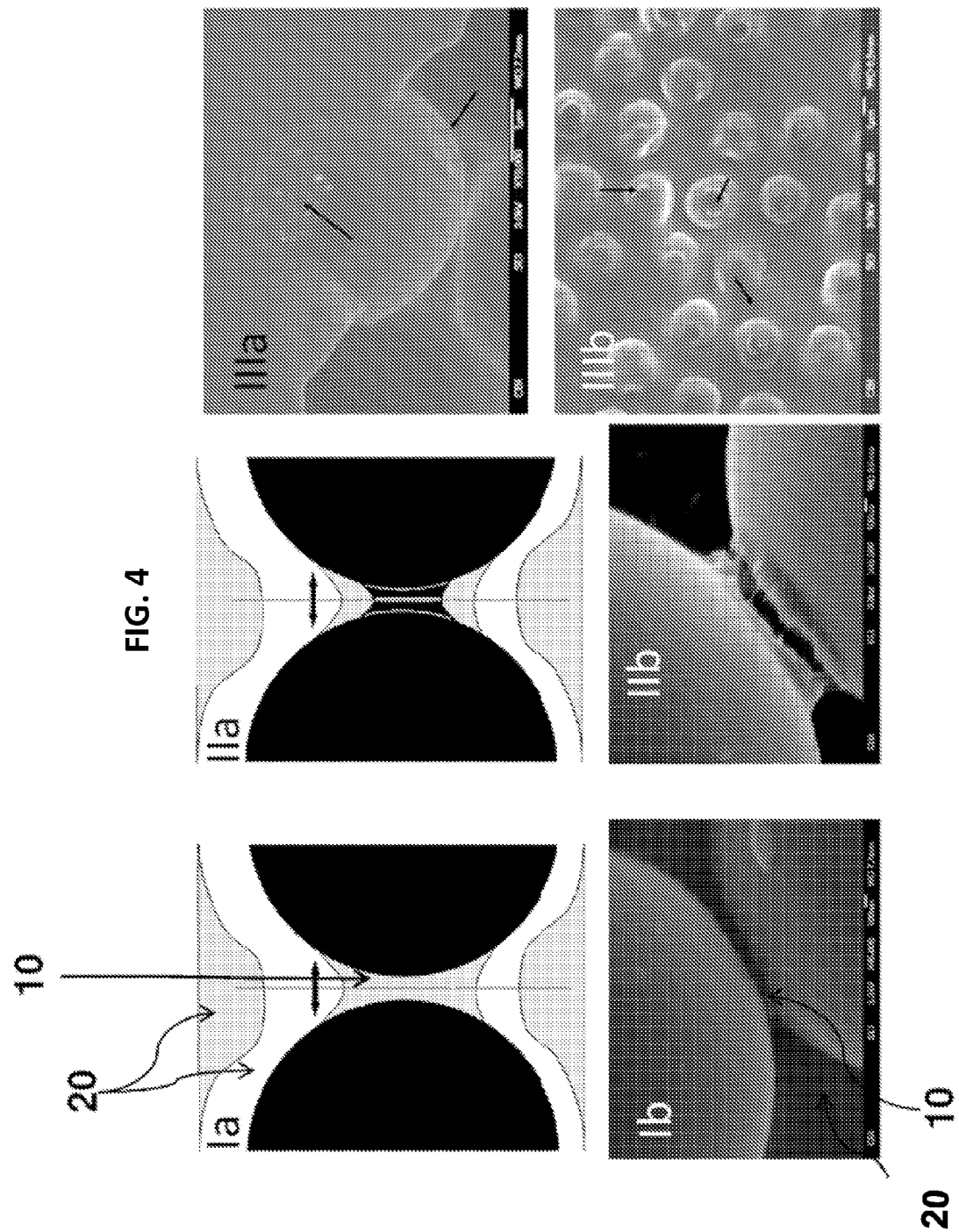
FIG. 4 demonstrates dewetting induced PDMS patch formation at the contact point or proximal region 10 of microspheres. PS microspheres (6 µm, Bangs Labs) at room temperature (Column I), 90° C. (Column II), at the time of PDMS (10% w/v) addition. (Ia and IIa) Schematic representations of patch formation (Ib and IIb) Scanning electron microscope (SEM) images of PDMS patches at proximal regions 10 (contact points) between the microspheres. Inset: Zoomed out image demonstrating multiple particle proximal regions (arrows). (IIIa) Evidence for patch formation at the proximal regions only. (IIIb) Proximal regions (arrows) between microspheres and glass cover slip.
Figure 5:
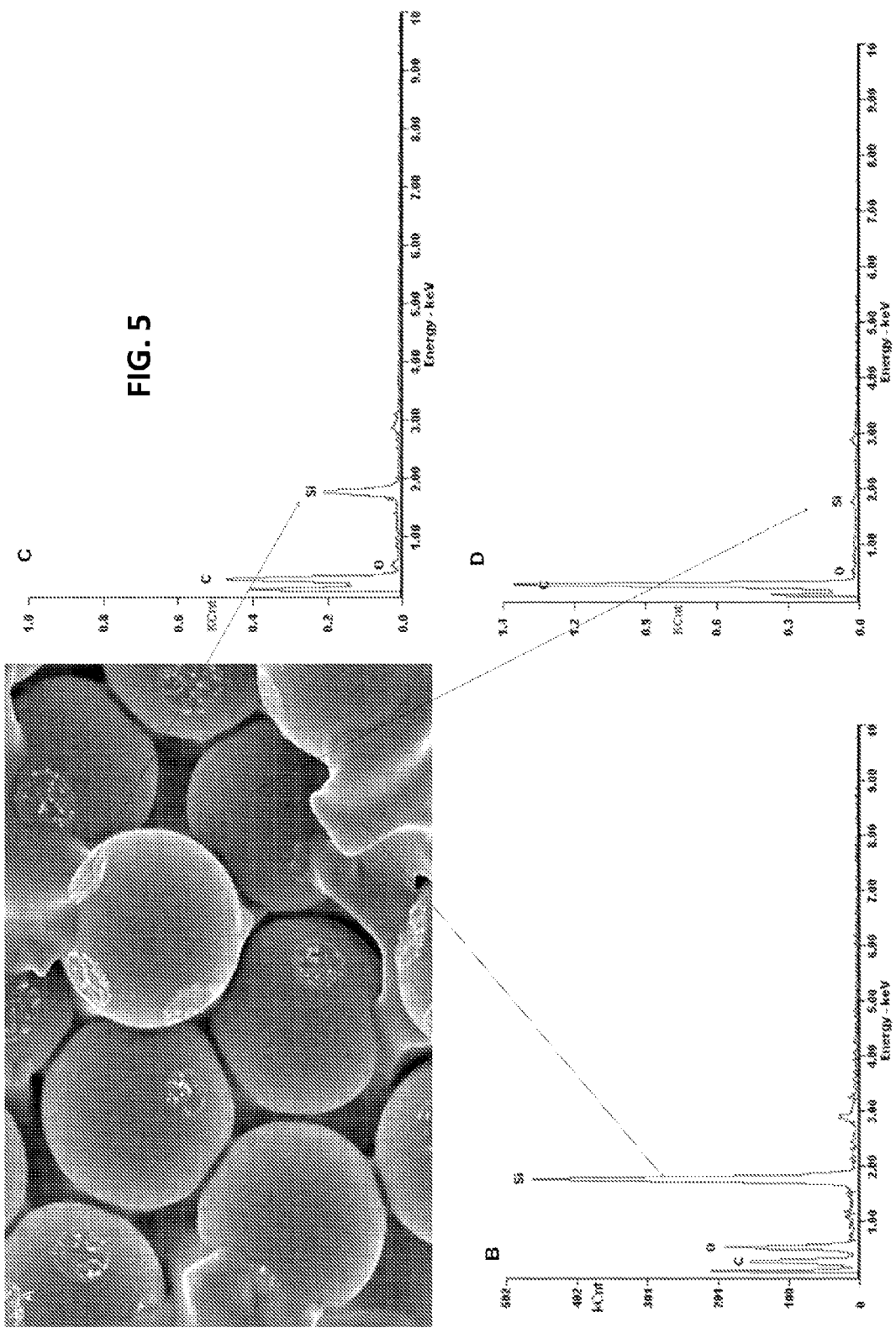
FIG. 5 depicts anisotropic microspheres with polymer or protein islets. (A) SEM image of PS microspheres on PDMS scaffold, EDAX image of (B) PDMS scaffold, (C) patches (D) Microsphere surface (Non-patched region)

As used herein, the "proximal region" in which the patches are formed is the region between adjacent microparticles (or a microparticle and an adjacent substrate surface) where the exterior surfaces of the particles are at the closest spaced distance from each other and/or are physically contacting each other. Illustrative proximal regions 10 are shown in FIG. 4. The narrow dimensions of the proximal region enables capillary-induced introduction of the patch-forming agent into channels in the proximal region. In addition, the dimension difference between the smaller-dimension proximal region and the larger-dimension interstitial space between the microparticles enhances selective removal (via dewetting, drying, etc.) of the patch-forming agent from those areas of the surfaces on which patch formation is not desired. In certain embodiments, the proximal region is a region of the microparticle surface where the thinnest liquid layer migrates and condenses at the last stage of solidification. The patch-forming agent only binds to the region of the microparticle surface that is contiguous with the proximal region. The dimensions of the proximal region may vary according to the specific microparticle assembly arrangement, the surface roughness of the microparticle, the composition of the microparticles and/or the spacing created between the microparticles by the introduction of the patch-forming agent fluid between the microparticles. In certain embodiments, in the proximal region the average distance between adjacent microparticles, or between a microparticle and an adjacent substrate surface, is equal to or less than 1000 nm, more particularly equal to or less than 500 nm, and most particularly equal to or less than 100 nm, and especially equal to or less than 50 nm.

As used herein, the "interstitial space" is the area between the microparticles that is outside of the proximal region. In other words, it is the area on the microparticle surface on which patches are not formed because the capillary/condensation conditions are insufficient to induce binding of the patch-forming agent to the exterior surface of the microparticle. In most embodiments, the interstitial space defined by the areas in which the distance between the exterior surfaces of adjacent microparticles is greater compared to the narrow distance of the proximal region. Illustrative interstitial spaces 20 are shown in FIG. 4.

The liquid removal from the interstitial spaces can be controlled and guided to make specific patterns of patches on the surface of the microparticles. In certain embodiment, a desired pattern of patches can be achieved by arranging the microparticles in a specific sequence.

The patch-forming agent and the microparticles are contacted together under conditions sufficient for solidifying the patch-forming agent. The solidification can occur via any phenomena such as polymerization, drying, freezing, contact with a non solvent for the patch-forming agent, or a combination thereof. The contact step may occur under ambient room temperature and room pressure. In certain embodiments, it may be useful to preheat the microparticles prior to contact with the patch-forming agent (e.g., from 40 to 100° C., more particularly 60 to 80° C., for 5 minutes to one hour, more particularly 10 minutes to 30 minutes).

The methods disclosed herein provide the flexibility of producing any desired number of patches in any desired pattern over the entire exterior surface of the microparticles (e.g., over both hemispheres of a microsphere in a single patterning step). The methods employ a three-dimensional patch material application process since the entire exterior surface of the microparticle can be accessed in a single patch application step. This contrasts the presently disclosed methods against methods that employ a two-dimensional projection process (e.g., a lithographic process) for applying materials to a microparticle surface.

In one embodiment, molecules during polymerization or condensation are dewetted at the junction between adjacent microspheres, and the condensed molecules separate from the microsphere surface except at the junction (also referred to herein as the "proximal region"). The lamination at the proximal region of the condensed molecules to the microsphere is regulated by the surface properties of the microsphere, whereas the delamination in the bulk are regulated by the bulk phase shrinkage of the polymer. The lamination/delamination breaks at the ridge of the proximal region due to differential polymer packing between the two phases. This creates an egg crate-like architecture around the microspheres which is in contact with the condensed material where it is stabilized. The egg crate-like scaffold is interconnected through holes arranged in a specific pattern. This structure is also amenable to the application of microfluidics inside the scaffold. Post-pattern functionalization of microspheres inside this scaffold is therefore easy and robust. For example, this technique can be employed for dual labeling of proteins onto microspheres. The second protein is specifically labeled to the patches after etching the condensed polymer and is not present on the rest of the microparticle surface as described below in more detail.

Illustrative features of certain embodiments of the methods are:
a) The method ensures heterogenecity in composition, concentration, number, size, distribution and order of the patches onto the microspheres.
b) The method ensures easy and fast post pattern functionalization of the patches.
c) The functionalized microspheres can be easily retrieved by this procedure.
d) The procedure offers possibility of doing microfluidics during post pattern functionalization.
e) The process also ensures easy scale up to commercial scale for the processing of the microspheres.
f) The ordering of the microsphere demonstrated can be done instead of 2D to 3D level in a capillary or conical system for easy scale up.
g) The system works under conventional laboratory conditions therefore does not need any sophisticated equipments for patterning.
h) The system could be explored for patterning and functionalisation of any kind of solid microspheres.
i) The patches can be differentially labeled for different purposes, which can probe and act according to the local environment.
j) They can also make to organize or made dynamic into different dimensions which can mimic atomic interactions, potentially leading to new particle flow phenomenon.

Microparticles

In certain embodiments, the microparticles available for patterning as described herein may have an average particle size of less than 1000 µm, and more particularly less than 500 µm. In certain embodiments, the microparticles have an average particle size of 1 to 100 µm. The microparticles may have any shape but in particular embodiments the microparticles are microspheres which can have an average diameter of less than 1000 µm, more particularly less than 500 µm. In certain embodiments, the microspheres have an average diameter of 1 to 100 µm, more particularly 1 to 50 µm, and most particularly 1 to 20 µm.

In certain embodiments, the microparticles are microspheres having a relatively smooth surface. For example, the surface roughness may be less than equal to 100 nm and/or the distance between two neighboring projections should be no more than 1/50th the diameter of the microsphere. The exterior surface should also be continuous (i.e., the least number of surface pores, <50% of the surface is covered with pores). The microsphere interior can be either porous or non porous. The microsphere also can be hollow, intact or a filled microsphere. The microparticle should have a rigid surface at the time of condensation to act as a substrate for the condensation processes disclosed herein.

The microparticles may be synthetic meaning that the microparticles are not naturally occurring. The microparticle can be made of non degradable polymers such as polymers that include styrene, (meth)acrylate, or any polymer with a high glass-transition temperature (Tg). For example, the microparticle may contain a polymer resulting from the polymerization of one or more monomers selected from the group consisting of acrylonitrile, styrene, or acrylates such as methacrylonitrile, divinyl benzene, p-methyl styrene, benzyl methacrylate, phenyl methacrylate, ethyl methacrylate, 2-hydroxyethyl methacrylate, cyclohexyl methacrylate, acrylamide, methacrylamide, hydroxypropyl methacrylate, methoxy styrene. Alternatively, the microparticle contains a co-polymer (random or block) selected from the group consisting of styrene-methacrylate, styrene-PMMA, styrene-PHEMA, benzyl methacrylate-PMMA, styrene-butylacrylate, and styrene-PEMA. The strength and durability of the polymeric microparticle is increased by crosslinking polymer chains or the strength is reduced by adding polyethylene glycols or using plasticizers chosen from the respective class group consisting of alkyl adipates, alkyl phthalates, alkyl azelates, alkyl benzoates, alkyl citrates, soy and linseed oils, and mixtures thereof. The microparticles also can made from biodegradable polymers with high Tg such as block co polymers of poly(ethylene glycol), poly(propylene glycol), with poly(ε-caprolactone) or polylactides, polycaprolactones such as dioles and trioles with high molecular weight above (Mn=30,000 or above), polyanhydrides and esters such as lactide and glycolide polymers such as poly-L-lactide, poly (dioxanone), poly-DL-(lactide-co-glycolide) and poly(glycolide), poly(sebacic acids) or its derivatives, polyphosphazenes such as poly(bis(4-carboxyphenoxy)phosphazene) and poly[bis(1-(ethoxycarbonyl)-2-phenylethylamino)phosphazene] and poly phosphor esters such as poly[(lactide-co-ethylene glycol)-co-ethyloxyphosphate], and poly[1,4-bis (hydroxyethyl)terephthalate-alt-ethyloxyphosphate]. The microparticle also can be made of natural polymers like chitosan, alginate, pullulan etc. or a combination thereof. The microparticle also can be an inorganic microparticle containing a plurality of hydroxyl groups and attaching an initiator agent to the hydroxyl groups to form attached initiator agents with specific finctional groups. For example, the substrate is silica, alumina, mica and other ceramic composition of calcium, magnesium or zinc phosphates. Alternatively, the substrate is a crystal, nanoparticle, liposome aggregate or hollow sphere, which has been coated with the above said inorganic materials. Further illustrative microparticles are solvent sensitive hydrogel microspheres, provided its surface remains rigid for the period of condensation of the mask. Of course, the microspheres can be made from any of materials described above for the microparticles.

Patch-Forming Agent and Patch Pattern

As described above, the patch-forming agent is contacted with the microparticles to form a microparticle/patch-forming agent assembly. The patch-forming agent as a standalone material may be mixed with the microparticles. Alternatively, the patch-forming agent may be included as a component in a liquid composition with at least one liquid carrier. The liquid carrier may be any liquid that can carry the patch-forming agent into the proximal region. For example, the patch-forming agent may form a mixture, suspension, dispersion, emulsion or solution with the liquid carrier. Illustrative liquid carriers include polar protic solvents such as water, acetic acid, ethanol, methanol, isopropyl alcohol, n-propanol, n-butanol, and formic acid; less polar solvents like dichloromethane, tetrahydrofuran, ethyl acetate, acetone, dimethyl formamide, acetonitrile, and dimethyl sulfoxide; and non polar solvents such as pentane, cyclopentane, hexane, cyclohexane, benzene, toluene, 1,4-dioxane, chloroform,and diethyl ether; or combinations thereof. In certain embodiments, more than one patch-forming agent may be included in the liquid composition. For example, in the case of polymerizable materials a combination of monomers such as methacrylates and dimethacrylates; silicone oligomers and cross linkers; ionic natural polymers such as alginate, chitosan and ions such as calcium, polyamines and poly phosphates etc., may be used. In the case of nanoparticles as a patch-forming agent, the nanoparticles may be introduced as a dispersion made of a polymeric component such as the ones made from the above-mentioned monomers or a polymer of the said monomers, or block co-polymer made from that or pendant polymers using the polymers as a back bone, or inorganic nanoparticles of silica; alumina; calcium phosphate; sodium, potassium, zinc, magnesium, aluminum phosphate, carbonate, chloride, or bicarbonate etc.; or metallic nanoparticles made out of iron, gold, silver etc.; or liposomes made of phsophatidylcholine, phospatidyl ethanolamine, phosphatidyl glycerol, cholesterol or in combination with a protein such as albumin, globulin or insulin etc., either alone or any combination thereof may be used, resulting in the formation of a nanoparticle ranging in average size from 1 to 1000 nm, preferably less than 500 nm, and particularly of 1 to 100 nm. The nanoparticle size must be sufficiently small so that the nanoparticles can be introduced into the proximal regions and undergo condensation. The patch can also be formed by using one or a combination of the above-disclosed materials which solidifies upon drying, polymerization, freezing or while treating with a non solvent. The liquid composition may include at least one additive in addition to the patch-forming agent and the liquid carrier.

The concentration of patch-forming agent in the liquid composition may vary provided that the concentration is sufficient for supplying the desired amount of patch-forming agent into the proximal region. For example, the concentration may range from 1 picoM to 1 M, more particularly 1 nM to 0.1M, most particularly 100 nM to 1 mM. In certain embodiments, the patch-forming agent concentration may be increased to provide a supplemental amount of patch-forming agent that can occupy at least a portion of the interstitial space after condensation. In this embodiment, the supplemental patch-forming agent can form a rectilinear pattern (e.g., lines) upon condensation.

During condensation the excess liquid carrier may be removed from the microparticle/patch-forming agent assembly. For example, the liquid carrier may evaporate under heating and/or a reduced pressure. The liquid carrier may also be removed via filtration (which may be aided by suction) or drainage. In other instances, the liquid carrier itself may solidify (e.g. polymerize or crosslink with the patch-forming agent).

The composition of the patches is chemically and/or physically distinct from the composition of the microparticles. For example, the patch-forming agent may be a polymer, a polymer precursor, a salt, a carbohydrate, a lipid, or a mixture thereof. The polymer may be any polymer that solidifies upon drying such as polyalkylene glycols (e.g., polyethylene glycol, polypropylene glycol); a (meth)acrylate polymer made from monomers such as methacrylate, dimethacrylate, and/or (meth)acrylic acid; polysilicone polymers made from silicone oligomers and cross linkers; ionic natural polymers such as alginate, chitosan with ions such as calcium; polyamines; polyphosphates etc.; or a combination thereof. The polymer precursor may be any oligomer and/or monomer of the above-described polymers that polymerizes and solidifies under the condensation conditions described herein. The carbohydrate may be a water-soluble polysaccharide such as a glucan (e.g., glycogen, starch, cellulosic polymers such as carboxymethyl cellulose and hydroxyl propyl methyl cellulose, dextran, beta-glucan, maltodextrin), a disaccharide (e.g., sucrose, trehalose), a monosaccharide (e.g., glucose) or a polyol (e.g., mannitol). The salt may be an inorganic salt such as a metal salt (e.g., calcium, aluminum or magnesium phosphate; sodium, calcium or potassium chloride; sodium, potassium or calcium carbonate) either alone or as a solid dispersion made with other salts, monomers, oligomers and polymers using water as a solvent. The patch-forming agent can be self assembled vesicles like lipid-based liposomes, polymer-based polymerosomes or layer-by-layer assembled polymeric particles that are very flexible and have low density either alone or a combination with one of the materials above.

IN certain embodiments, nanoparticles below the particle size of 500 nm also can serve as the patch-forming agent since such nanoparticles can be condensed between micron-sized particles.

The condensed patch material stability can be varied by forming different solid dispersions or solutions. Depending on the desired use, the condensed patch material can be very stable (solvent insoluble) or weakly stable (solvent soluble) upon further treatment. The condensed patch material also can itself be further functionalized by binding a functionalizing agent to the patch material. The condensed patches also can be used to protect the discrete region of the microparticle surface underneath the patch while other regions of the microparticle surface are functionalized. Thus, the two exterior surface regions (patch and non-patch regions) can be rendered chemically, physically and/or functionally distinct from each other.

The patches can be used for various functions. For instance, the patches can be used as protective masks for synthesizing dual function microparticles as described below in more detail. The patches can be used as communication portals with entities placed adjacent to the microparticles. The patches can be used as singular contact points for making microparticle-based joints and connectors. In general, the methods disclosed herein afford a higher level of control over the information contained in the microparticle packet. The methods disclosed herein also provide a flexible approach for further functionalizing the patch material either prior or subsequent to patch formation.

As described above, the patch-forming methods disclosed also are very useful for differential labeling of microparticles. The condensed patch material and/or non-patch regions of the exterior surface of the microparticles may be modified or provided with reactive functional groups such as amino, carboxy, thiol or hydroxyl groups. These reactive functional groups can then react with complementary reactive functional groups present on the labeling agent. The labeling agent, for example, may be a polymer, a polypeptide (e.g., a protein), an inorganic salt, a metal nanoparticle below 500 nm in particle size, or a combination thereof.

The shape of the individual patches may vary as desired. For example, the shape may be annular which can be formed in the embodiments in which adjacent microparticles physically contact each other. The shape may be a solid circle or disc. The shape also could be elongated such as elliptical, oblong, parabolic, rectilinear, or serpentine. An individual microparticle could include patches of varying shapes (e.g., circular patches and elongated patches) resulting in hybrid-shaped patch patterns.

The dimensions of the individual patches may vary. In one embodiment, a patch is less than the size of a hemisphere defined by the exterior surface of a microsphere. In other embodiments, the largest longitudinal dimension of a patch is not greater than half of the hemisphere of the microparticle diameter, more particularly not greater than two-thirds of the microparticle diameter, and most particularly not greater than one-third of the microparticle diameter. In certain embodiments, the largest depth dimension of a patch is not greater than 500 nm. For instance, the largest depth dimension of a patch may range from 50 to 100 nm, and more particularly from 10 to 50 nm.

The pattern of the patches arranged on the microparticles also may vary. For example, the pattern may be anisotropic. The pattern may be ordered such that each discrete patch is evenly spaced from each other. For example, in one embodiment there may be a plurality of spheres aligned along a single, or multiple, pre-defined axis or planes of the microsphere. The patch shape, pattern and amount may be controlled by the specific arrangement of the microparticles when preparing the microparticle assembly. For instance, the shape and pattern can be determined by the lattice or sphere packing order of the microparticles during the well-filling process for a three-dimensional system (see, e.g., FIGS. 7 and 9). In a two-dimensional system (e.g., microparticle "lines" or "doublets") substrates other than an adjacent microparticle can be employed to form a patch. For instance, a support substrate (e.g., a slide) can be used to make a third patch when a microparticle line has been formed.

After condensation of the patch-forming agent, the patch-forming agent may or may not still be present in at least a portion of the interstitial spaces. However, if the patch-forming agent is present in the interstitial space, it is not necessarily bound to the exterior surface of the microparticles in the region contiguous with the interstitial space. In the embodiments with no patch-forming agent present in the interstitial space the resulting construct assumes the form of a scaffold wherein the individual microparticles are interconnected to each other via only the bridges formed by the patches. In the embodiments with patch-forming agent present in at least a portion of the interstitial space the resulting construct assumes the form of a scaffold having an "egg-crate" structure. In other embodiments, the solidified microparticle/condensed patch-forming agent construct may be a two-dimensional line or doublets of microparticles interconnected to each other via the condensed patches. Individual microparticles having the patches formed on their exterior surface may be separated from the various solidified microparticle/condensed patch-forming agent constructs by applying mechanical force to the construct.

Further illustrative embodiments are described below in the following numbered paragraphs:

1. A method of functionalizing particles, comprising:
   a. arranging particles in a two- or three-dimensional pattern;
   b. contacting the particles with a solvent comprising a polymer to produce a polymer mixture; and
   c. dewetting the polymer mixture to produce functionalized particles having patches of the polymer on their surface.
2. The method of paragraph 1, further comprising after dewetting the polymer mixture, separating the functionalized particles from each other and from any residue of the polymer present after the dewetting step.
3. The method of paragraph 1, wherein in the arranging step, the particles are arranged in an ordered pattern so as to produce regular (ordered, patterned, etc.) patches on a surface of the functionalized particles.
4. The method of paragraph 1, in which the polymer has different functional groups as the particles.
5. The method of paragraph 4, further comprising reacting a linker or labeling compound with a functional group on the functionalized particles.
6. The method of paragraph 5, in which the linker or labeling compound reacts with a functional group of one of the polymer and the particle, but not with a functional group of the other of the polymer and the particle.
7. The method of paragraph 6, in which the linker or labeling compound reacts with the particle and not the polymer.
8. The method of paragraph 7, further comprising removing the polymer from the particle to unmask a portion of the particle that is not reacted with the linker or labeling compound.
9. The method of paragraph 1, further comprising treating the functionalized particle with a surface-reactive composition to alter the surface of the particle that is not masked by the particle, and subsequently removing the polymer to expose untreated portion(s) of the particle.

10. A particle prepared according to the paragraph of claim 1.

EXAMPLES

Example 1

Disclosed herein are new techniques, which enable uniform patterning, post pattern functionalization and easy recovery. This is achieved by a combination of self assembly, scaffolding and microfluidics. Free-standing microspheres with round patterns of polymeric islets have been achieved. These polymeric islets can be utilized as sites for functionalization or a mask to protect the underlying functional groups. Soft supramolecular architectures of polymers, quantum dots or biological molecules can be patterned. Carboxylated polystyrene particles were selected as the model substrate. Polydimethylsiloxane (PDMS) was selected for the scaffolding purposes. All the processes were done under normal laboratory conditions, to develop an easy protocol that can be scaled up.

Figure 1:
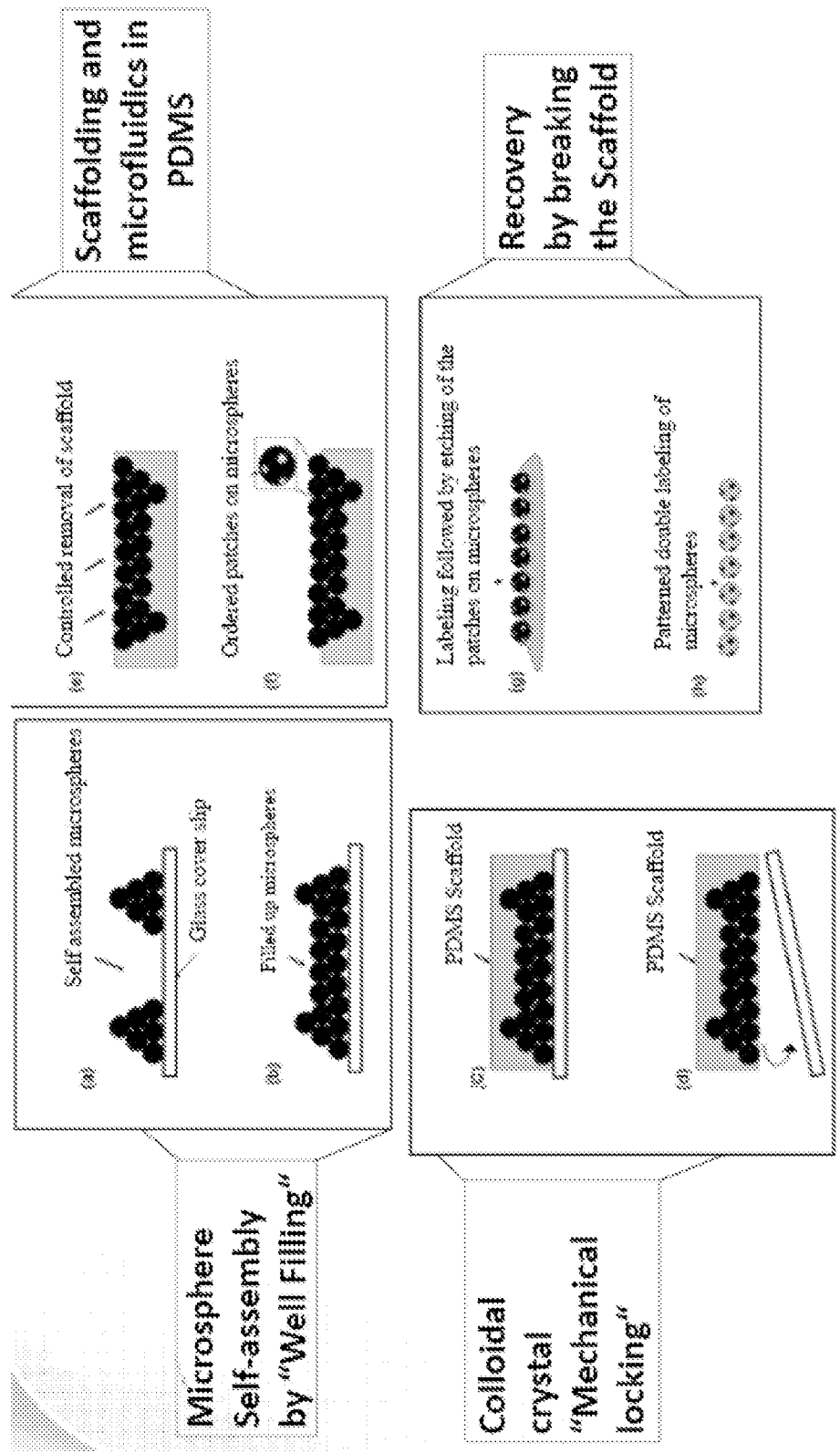
FIG. 1 is a schematic representation of one embodiment of the methods disclosed herein.

The method of preparation is schematically illustrated in FIG. 1. Carboxylated PS microspheres are self-assembled under lateral capillary force to a cc phase. The microsphere suspension in water was dried on cleaned glass cover slips at 40° C. They are self-assembled and further stacked one above the other plane to form a "coffee-ring" pattern. These coffee-rings appear like a "micro-well". Further microspheres are introduced into this wells and dried at RT to form a closely packed microarray. A PDMS oligomeric solution was added to the microarray and polymerized. After setting the polymeric scaffold it is removed along with the microsphere from the glass cover slips and used for further post pattern functionalization.

FIG. 2 shows the coffee-ring pattern of microspheres formed by different solvents. The change in packing of the microspheres is related to the surface tension and partial vapor pressure of the solvents. Three solvents were selected depending upon their surface tension and vapor pressure. The surface tension decreases in the following order, water>ethanol>propylene glycol and the vapor pressure as, Propylene glycol (PG)>water (W)>ethanol (Eth). Perfect coffee rings were formed in the case of water with microspheres as stacks to the edge of the droplet, when it is dried. In the case of Eth similar but disturbed coffee rings were formed. In the case of PG single layer thick 2D films of microsphere were formed. The study was continued with water as a solvent.

Figures 8A, 8B, 8C, 8D, 8E, 8F:
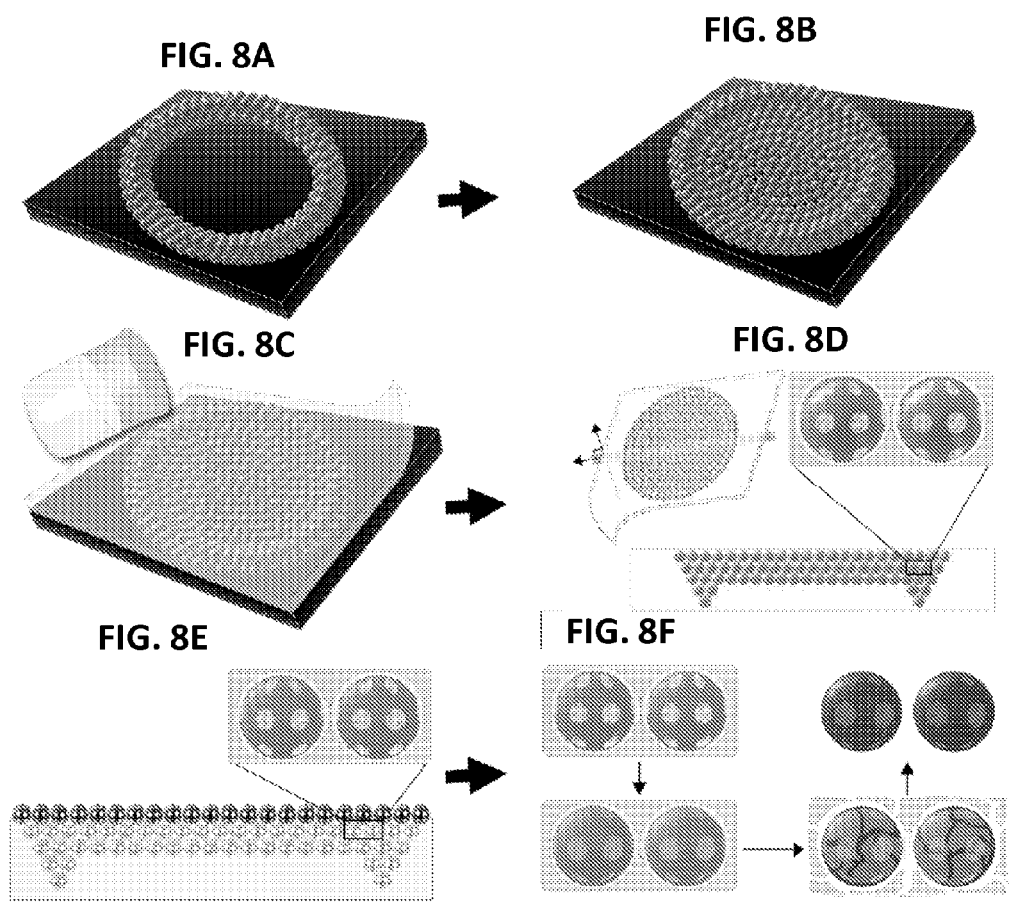
FIG. 8 is a schematic representation of the patterning procedure. (A) Microsphere well, (B) Colloidal crystal, (C) PDMS layering, (D) Microsphere with PDMS patch, (E) Single protein labeled particles with unlabeled regions under patches, (F) Dual protein patterned particles.
Figure 9E:
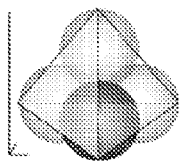
FIG. 9 demonstrates a well-filling strategy: (A) SEM image of a microsphere "well" created using water as a solvent (bar=100 μm), (B) Finished colloidal crystal formed by iteratively filling the "well" (bar=100 μm). (C) Packing of the particles at the edge of the wells shown in A (bar=10 μm), (D) internal view of packing in a finished colloidal crystal that has been physically split post-fabrication for visualization (bar=10 μm). Images are representative of 10 independent experiments. (E) Schematic diagram of the packing of microsphere in a minimum stable crystallite at the edge (F) and in the interior of the colloidal crystal
Figure 9F:
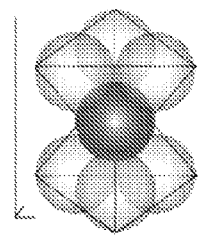

Formation of the microsphere arrangement is described in more detail in connection with FIGS. 8 and 9. The first step of the process (FIGS. 8A & B) involves the ordering of microspheres into a colloidal crystal using a "well-filling" technique (FIG. 9). By creating a "well" via particle convection towards the edge of an evaporating drop (like a "coffee ring") and iteratively filling this well with subsequent drops of particle suspensions, the particles are permitted to pack into highly ordered and regular colloidal crystals. Three different solvents were explored based upon their volatility to prepare microsphere suspensions and subsequently produce microwells: (a) Water (W), (b) Propylene glycol (PG) and (c) Ethanol (Eth). Uniform wells are formed in the case of water as the solvent, leading to tightly self-assembled and stacked microspheres at the edges. In the case of the relatively fast-evaporating ethanol, the majority of particles settled to the bottom of the drop instead of packing into the boundary. In the case of polypropylene glycol, a single layer of microspheres is formed due to the relatively slow rate of evaporation. Thus, water was used as the solvent in the following steps. For developing the wells, a dilute microsphere suspension (10% w/v) in water is dried on a clean glass cover slip by sequential drying at various temperature conditions from 40° C. to 90° C. to control the rate of drying (fast enough to produce the colloidal crystal but slow enough to avoid surface annealing). Subsequently, these wells were iteratively filled with a more concentrated microsphere suspension (30% w/v). After each addition, the microsphere bed was dried at 4-8° C. for slow and controlled packing of microspheres (FIG. 8E). Several such wells were created on a single cover slip.

Overall, this new process has multiple advantages over previously reported methods of forming colloidal crystals out of microspheres. Specifically, in these processes it is likely that lateral convective forces regulates the self-assembly of microspheres. In prior attempts, it was difficult to control the primary factors governing convective forces, resulting in line defects, point defects, drying cracks and stacking faults. Conversely, the "well-filling" strategy is amenable to controlling the rate of evaporation and the timescale of colloidal crystallization. Specifically, the rate of evaporation of the solvent was controlled as well as the concentration of the suspension in the iterative well-filling procedure, each of which contributes to the lateral capillary force that drives packing. The result of adjusting these properties during the well filling procedure repeatedly results in compact colloidal crystal of high integrity (no visible surface cracks, defect, etc.) (FIG. 9B). This results in 4 or 6 contact points between microspheres, depending upon whether or not the particle is on an edge or fully surrounded by neighboring particles, respectively (see FIG. 9). Liquid PDMS solution is then added to this finished colloidal crystal.

Figure 3B:
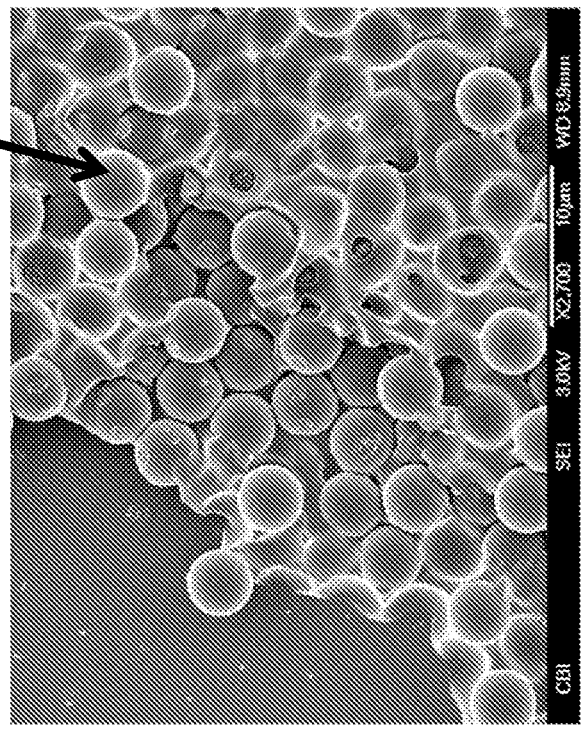
FIG. 3 depicts the distribution of microparticles with patterned patches. Microparticles 1 in PDMS scaffold (B); the dimension of patches 2 in each microparticle (A).
Figure 3A:
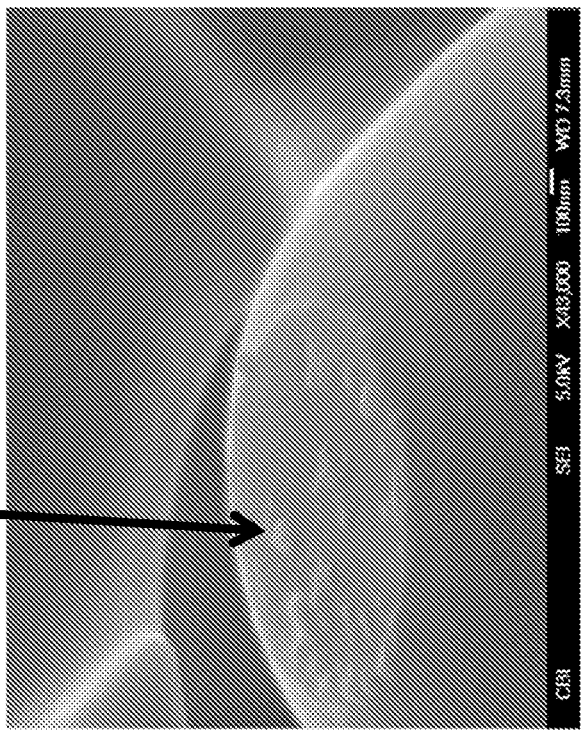

FIG. 3 shows the PS microsphere with patches. The patches are regular and ordered. The dimension of the patches is uniform throughout. The number of patches depends upon the microsphere position in the scaffold. Those which are between two consecutive planes hold six patches/ microparticle. Two of them due to contact between adjacent microparticles in single plane and two each from above and below the plane. In the case of microparticles on the edge, it varies from 3 to 5. The most important observation was that the dimension and the thickness (<20 nm) of the patch were uniform throughout.

FIG. 4 shows the mechanism of PDMS patch formation into these microspheres. The patch formation was observed only at the proximal region 10, and not in the interstitial space 20. Preheating at 70° C. for 15 min led to close packing of the proximal region between the spheres. In this case, the PDMS forms a thin ring around the contact points. This could be explored for labeling with multiple proteins around the patches to get a bull's eye pattern. The size of the patches formed between the microparticles was similar to that formed on the cover slip. The line tension of the retracting polymer to the bulk PDMS was evident from the curved joints. The retracted PDMS bulk phase formed as "egg crate" around the microspheres.

Figures 10A, 10B:
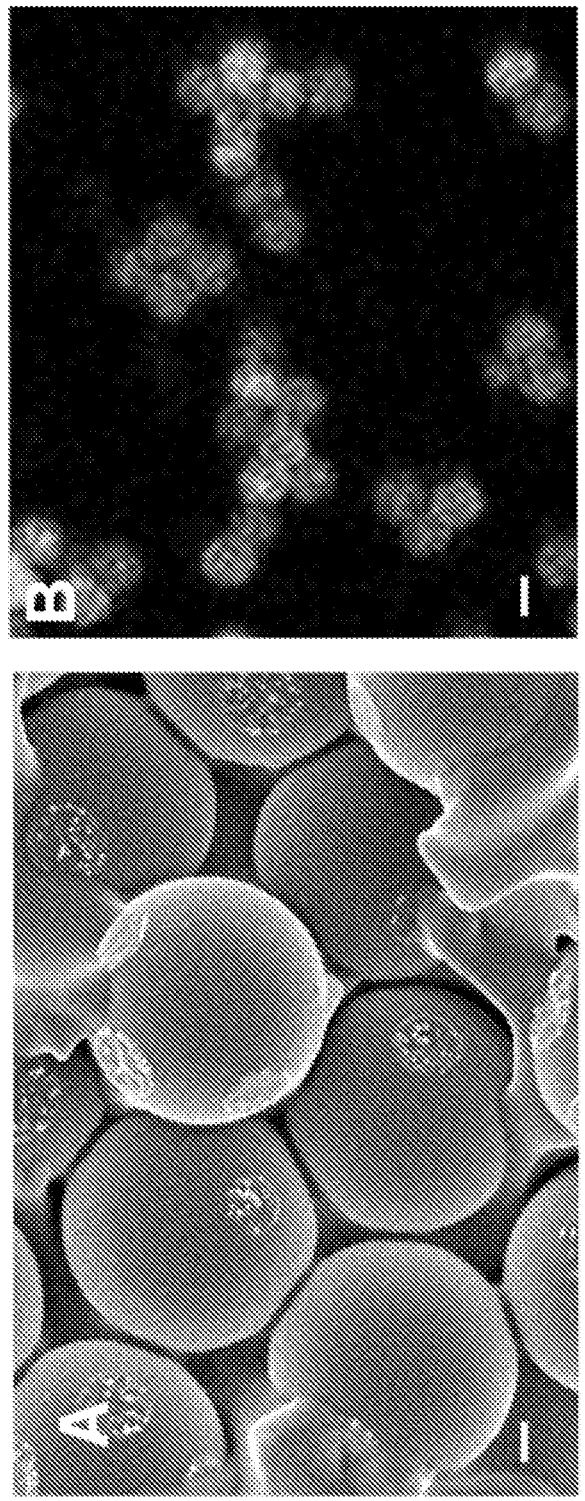
FIG. 10 shows anisotropic microspheres with polymer or protein islets: (A) SEM image of PS microspheres on PDMS scaffold (bar=1 μm). (B) Dual Protein patterned microspheres with FITC-avidin labeled body (green) and rhodamine-albumin labeled patches (red) (bar=5 μm)

FIG. 10 also shows the microstructure of the PDMS scaffold surrounding the colloidal crystal Importantly, adding the PDMS solution to the colloidal crystals did not disturb the crystal packing (FIG. 10A) of the microspheres. Upon solidification, PDMS appears as dewetted from the particle surface except at the proximal region between the microspheres. More specifically, at the proximal region of each microsphere, a thin patch of 10-15 nm thick and 150-200 nm diameter of PDMS is observed (FIG. 10A). Further, because PDMS dewets from the rest of the microsphere surface, a highly-connected egg-crate like structure is produced. For this reason, protein patterning could be performed inside the scaffold by taking advantage of the interstitial space between the PDMS and the microspheres.

Dual protein labeling onto these microspheres was also performed. For that the scaffold was first introduced into the solution containing amino linked biotin and conjugated, while the non-contact area of the microspheres are being modified. Then the scaffold is washed for removing any free or adsorbed conjugates. Then it is introduced into an etching solution under stirring to remove the thin PDMS layer at the contact points. The scaffold is further washed thoroughly to remove the etching solution. Further the second protein is directly immobilized to the contact points by EDC-NHS chemistry. The scaffold is further washed thoroughly to remove the adsorbed proteins and further introduced to solution containing avidin.

In more detail, the scaffold as such is used for further functionalization. For that 5 to 10 such scaffolds were immersed into water containing 0.1% Tween. Preferential Tween adsorption to the microparticles will reduce the non specific adsorption of the proteins. The strategy adapted for immobilizing the dual protein was to first immobilize the open area with PEGylated biotin. For that the carboxylated PS microspheres were treated with EDC, 0.1 M and NHS 0.2 M in 200 μl MES (5.5) buffer was used. The reaction is allowed to continue for 1-2 hrs. The solution is removed after the reaction. Washed two times with MES buffer. To this 50 mM biotin-PEO in 200 μl MES buffer was added. The reaction is allowed to follow for another 1-2 hrs. The solution was removed and the PDMS was washed two times with MES buffer. For etching, Tetra Butyl Ammonium Flouride (TBAF) in N Methyl Pyrrolidone (NMP). The NMP/Water ratio was maintained as (1:6) (This proportion does not swell or dissolve the PS). 0.1% tween is added to the water for the easy penetration of the etchant to the microdomains and fast removal of the oligomers of PS. The etching was continued for 1 hr. Further the scaffolds were washed two times with the MES buffer. Then immobilize the second protein to the place of removed patches. Again the EDC-NHS chemistry was followed as mentioned earlier to the patches. Further 0.4 gm of albumin rhodamine dissolved in 200 μl MES buffer with 0.1% tween and 1% BSA from that 20 μl MES buffer to the PDMS scaffold in 180 μl MES buffer. The reaction is continued for 2 hrs in dark. The scaffold was washed as mentioned earlier. Then 200 μl MES buffer with 0.1% tween and 1% BSA containing 0.2 mM avidin flourescein was added to the washed scaffolds. The reaction was allowed to continue for another 2 hr in dark. Then the scaffolds were washed two times with MES buffer, and stored in MES buffer until imaged.

Figure 6B:
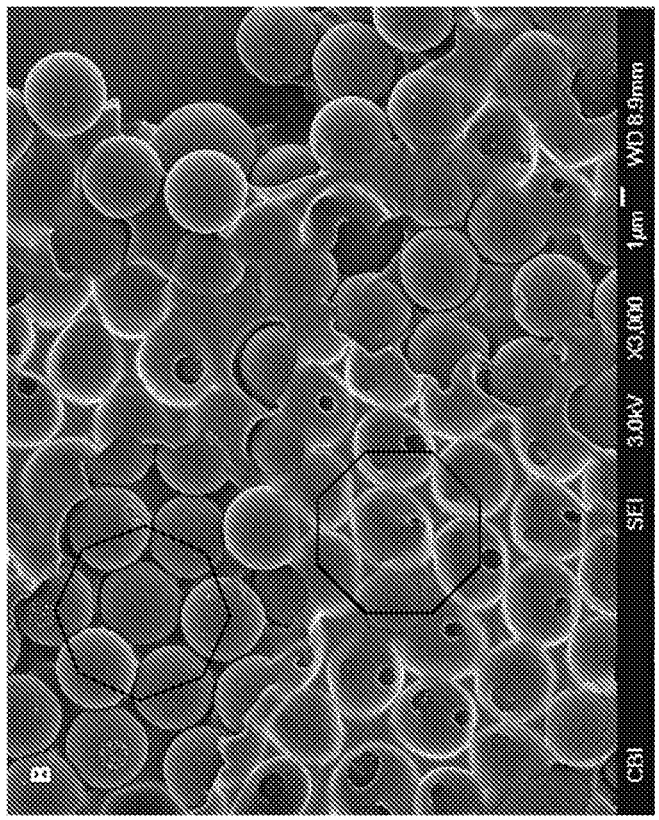
FIG. 6 shows the recovery of microspheres. Particles separated from the scaffold (A) arrow indicate the separated microspheres; less contact between the particles and PDMS (B), the hexagon indicates that the particles are stabilized by lateral interlocking between them.
Figure 6A:
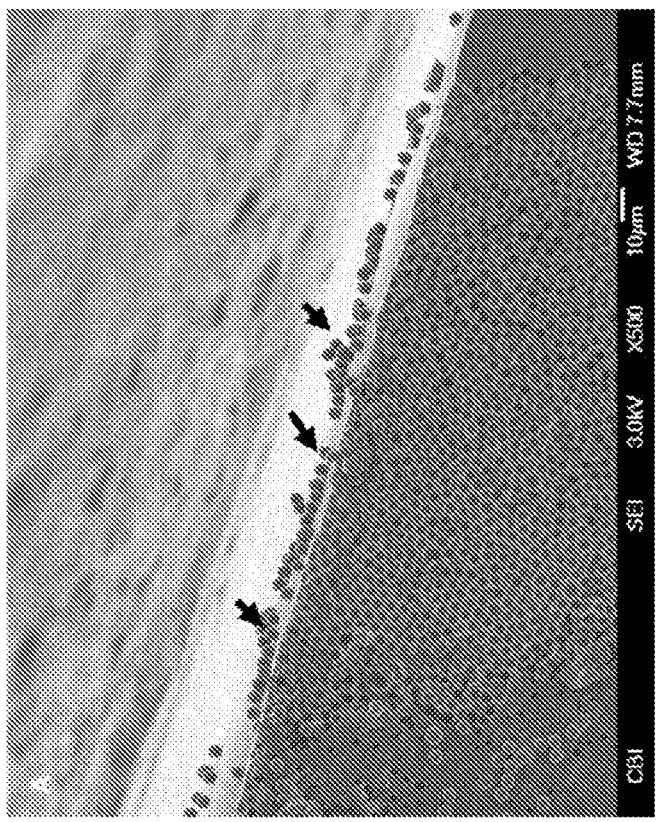

FIG. 6 shows the recovery of the microspheres from the scaffold. The retracted PDMS forms a loose network like egg crate around the microspheres. This led to the easy removal of the microspheres from the PDMS scaffold.

The mechanism of patch formation appears to occur through simultaneous dewetting and capillary phenomena. Initially, the PDMS solution is wicked into the colloidal crystal in a rapid and uniform fashion as expected. Upon solidification, PDMS dewets due to polymer incompatibility. However, in the proximal region between microspheres, PDMS appears to further wick into this space where it cross-links. Furthermore, it was observed that this process is more efficient when particles are slightly preheated prior to casting of the PDMS, suggesting that heat diffusion plays a role in PDMS solidification and bridge formation in the proximal region. The result of bridge formation in the proximal region with interstitial space dewetting is an "egg crate" like structure that forms around the colloidal crystal (FIG. 10A). As a whole, this structure is quite conducive to differential labeling strategies. Bioconjugate linkages (i.e. protecting groups) were implemented for the outer area and subsequent direct covalent linkages were used for regions protected by patches. The patch etching process does not affect the particle or the immobilized bioconjugate linker (biotin), since the etching agent (TBAF) specifically reacts with the silane linkages in PDMS. Finally, the brittleness of the resulting PDMS scaffold enabled easy separation of the dual protein patterned microspheres with numbers of patches that correspond with the packing of the colloidal crystal.

In summary, a new method to achieve ordered and regular patterns on a microsphere surface, generating anisotropic "patchy" particles, was demonstrated. This method is particularly attractive for patterning soft molecules onto relatively "hard" microspheres.

Example 2

Figure 11A:
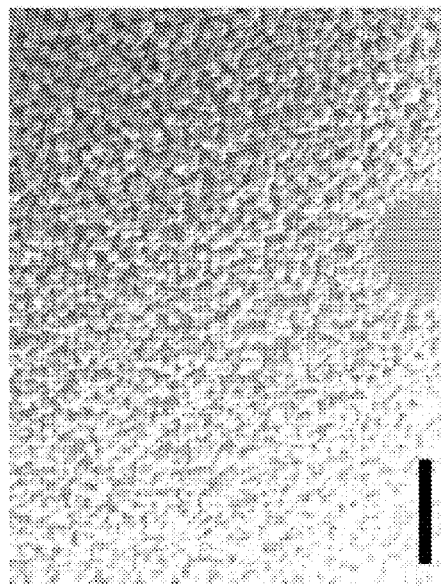
FIG. 11 shows patterning of various kinds of mask by exploring the lateral capillary force. Different patterns of lipid membranes on microspheres. (A) Patterning thin lipid film on the one surface of microspheres, (B) Fingered projections of lipid film with increased chol concentration except the proximal regions, (C) The effect of concentration of liposome concentration in the distribution of liposomes, (D) Nesosome patch formed at the proximal regions.
Figure 11B:
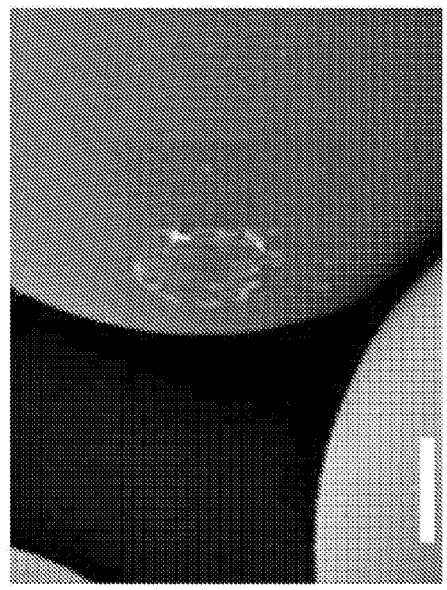
Figure 11C:
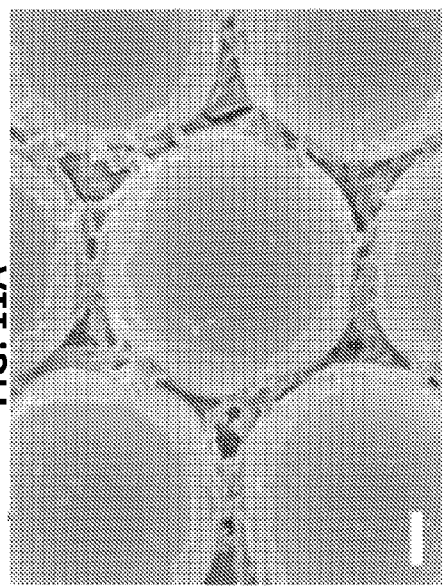
Figure 11D:
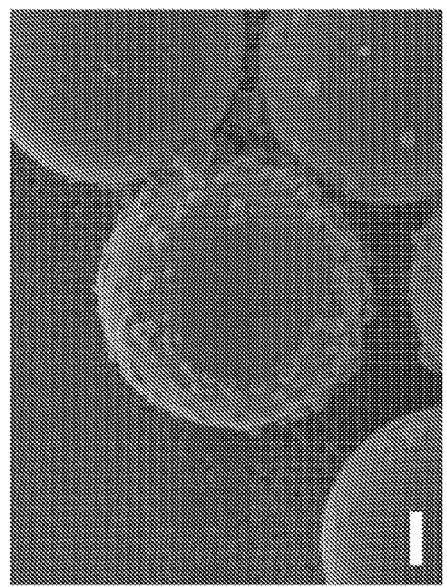

Lipid membranes were patterned on PS microspheres by exploring the membrane rigidity, lateral capillary force and surface rigidity of microspheres. In the case of most pliable liposomes made of (phospahtidylethanolamine (PC)/Cholesterol (Chol) (1 or 1/0.1 or 0.2) w/w, they form fused lipid membranes only on one of the hemispheres when the liposome concentration is 0.15% w/v in DIW (FIG. 11A). As the cholesterol concentration was increased to 0.3 to 0.5% w/w the liposomes form very rigid finger like protrusions, where the liposomes could not penetrate and fuse to form thin films at the proximal regions (FIG. 11B), as the liposome concentration reduces the distribution of fingered projection also reduces. In the case of neosomes of (tween 80/Chol 1/0.1 w/w) again condensation only occurs in the proximal region.

Example 3

Figure 12:
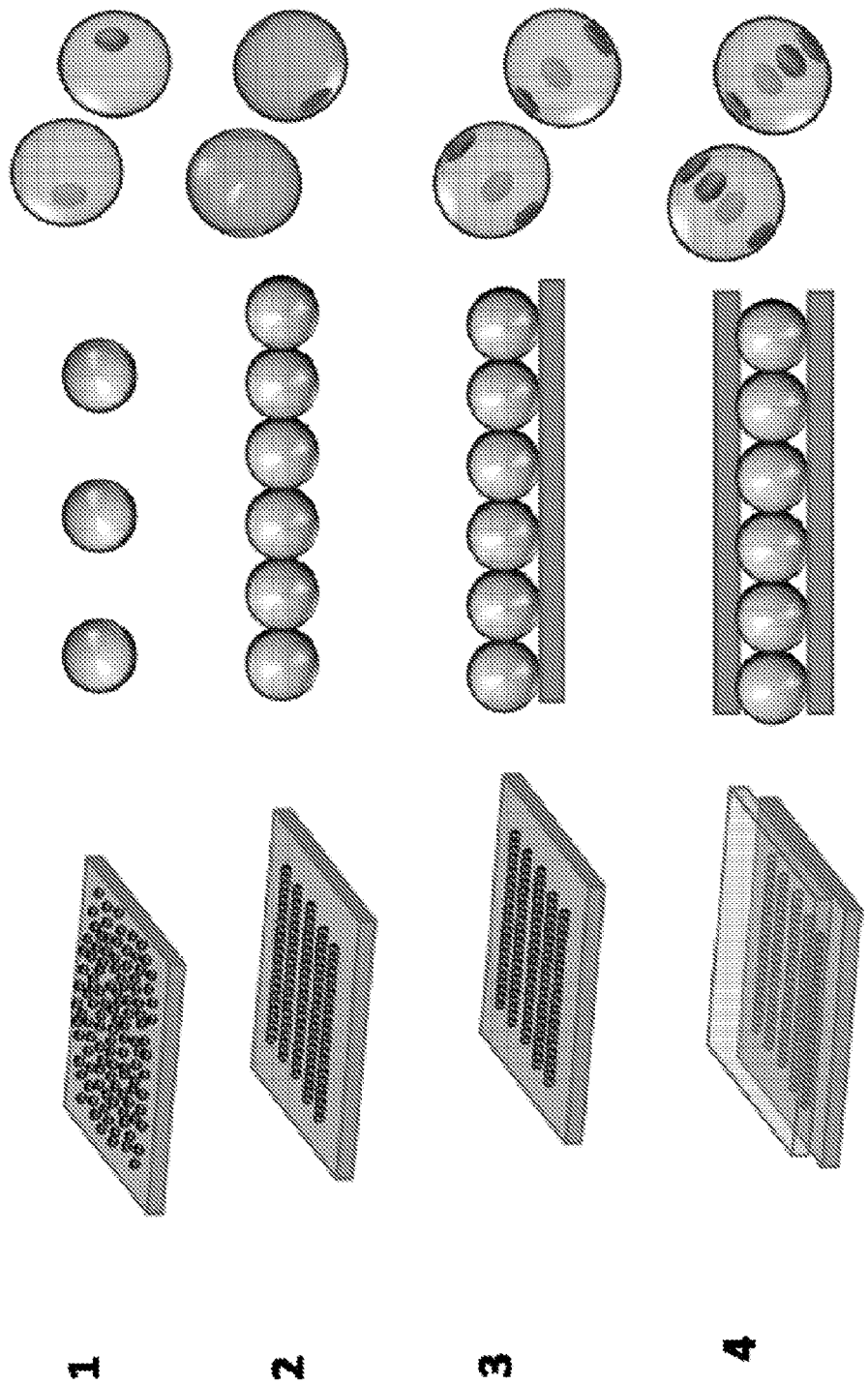
FIG. 12 illustrates a scheme for development of particles with predictable number of patches. (1) Single patch microspheres by evenly distributed particles on a porous substrate (the patch forms in the proximal region between the microsphere and the surface of the substrate), (2) Bipolar microspheres, when particles are arranged in a line on a hydrophobic porous substrate (the patches form in the proximal region between adjacent microspheres), (3) Microspheres with three patches, when particles are arranged in a line on a hydrophilic porous substrate (the patches form in the proximal region between adjacent microspheres and in the proximal region between the microsphere and the surface of the substrate), (4) Microspheres with four patches, when (3) covered with another porous membrane.
Figure 13B:
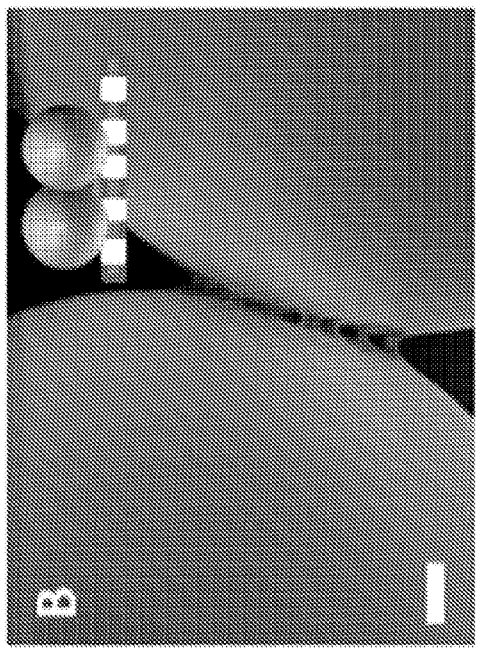
FIG. 13 shows bipolar microspheres using sodium chloride crystal mask formed at the proximal regions. (A) Arrangement of microspheres formed in line. (B) The sodium chloride crystal condensed at the proximal regions. Fluorescent images of (C) Microsphere with two patches, (D) Green channel, (E) Red channel.
Figure 13A:
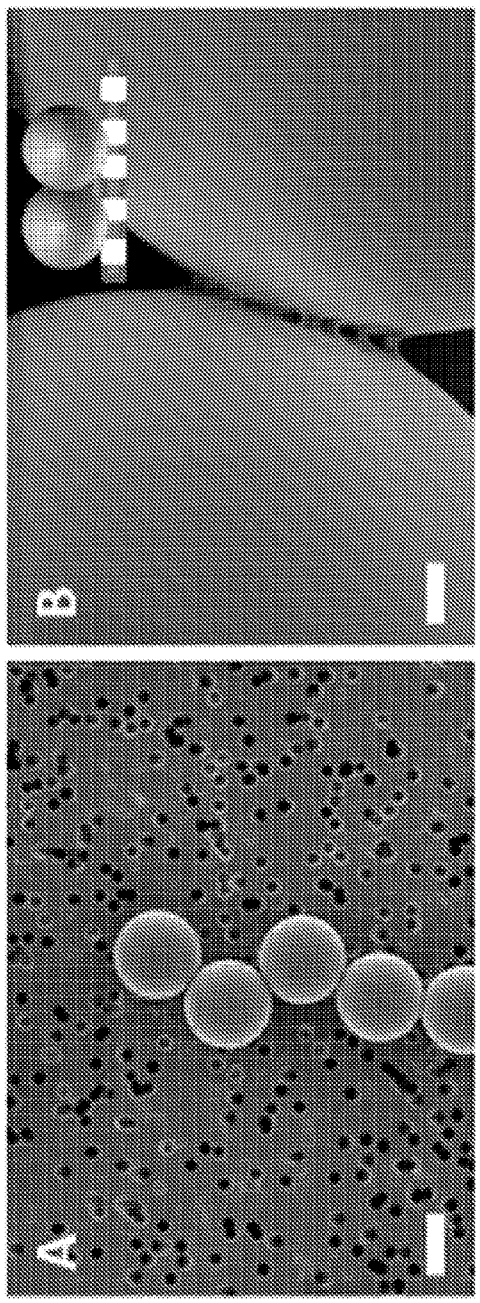
Figure 13E:
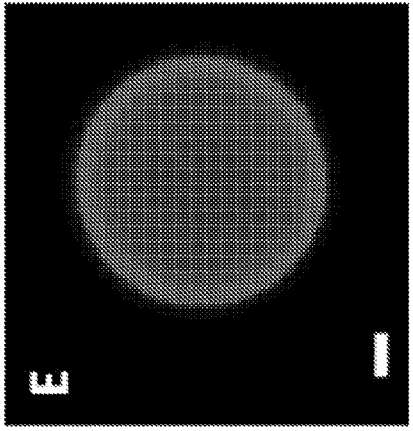
Figure 13D:
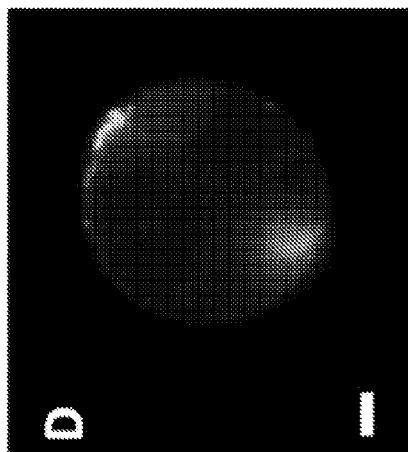
Figure 13C:
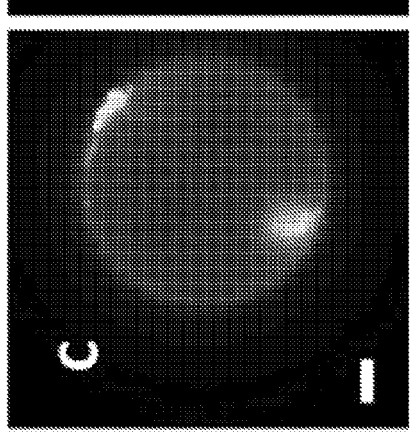
Figures 14A, 14B, 14C, 14D, 14E:
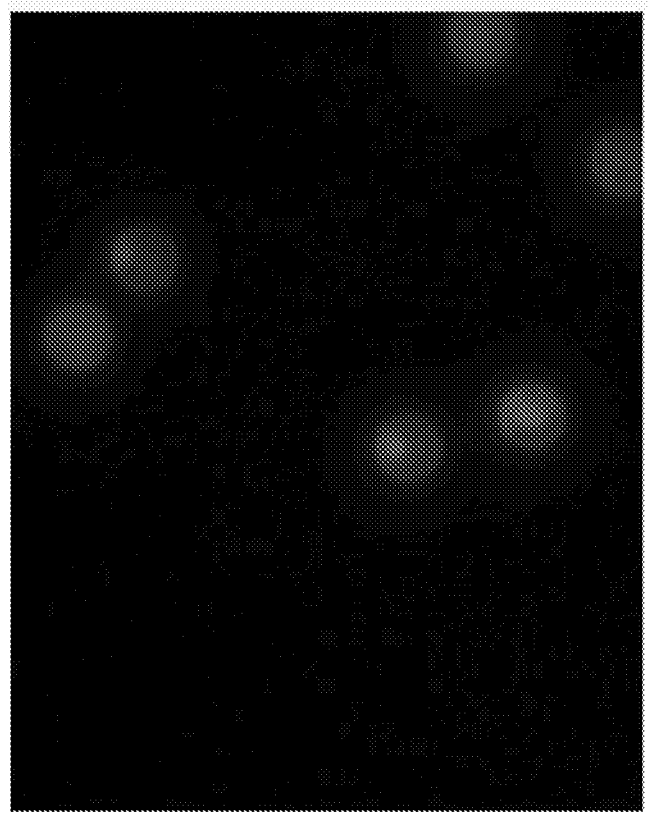
FIG. 14 shows single protein patch on microspheres by condensing PEG gel between the microspheres. Doubleting of microspheres with a mask (A), Breaking of the doublet to singlets (B), Labeling at the proximal regions (C), Etching of the remaining mask to liberate the microspheres (D and E).

To explore the interfacial condensation induced pattern formation for developing specific number of patches on microspheres the procedure shown in FIG. 12 was adopted. Where a predetermined packing and arrangement of the microsphere was developed by varying the microsphere concentration and guided self-assembly of the microspheres. For that a porous substrate was used to control the flow of the solution. A plotter with a swiper was explored for the laying of the microspheres with the solution spread swiftly on the surface. The self assembly of the microspheres was induced by a shape memory fiber which is added along with the solution. When a drop of the microsphere in mask solution with the fibers are dropped on the porous substrate and swiped the microspheres get arranged in the direction the fiber is arranged and the remaining mask solution is flown out through the filter membrane. In the case of a hydrophobic porous membrane the patches are formed only between the microspheres which are coming in contact with one another. In the case of a hydrophilic porous membrane patches are formed on microsphere surface which comes in contact with the surface also.

Example 4

FIG. 13 shows the bipolar patches formed on a microsphere developed as per the strategy explained as in FIG. 12. A mask of sodium chloride was used in this process. For that succinimide-derivatized microspheres are dispersed in a solution of sodium chloride and polyethylene glycol solution (1:1 w/w) concentration and was layered on a hydrophobic porous membrane in lines. In the resulting microspheres the patches are formed only at the proximal regions between the microspheres (FIG. 13B). The resulting microspheres were dual protein labeled by simple sequential washing of the mask after labeling the first protein followed by labeling with the second protein.

Example 5

In an alternative strategy a polyethylene glycol (PEG) gel was condensed between the microspheres, to label only the proximal region of the microspheres. For that the microspheres are sedimented from a suspension of PEG. The supernatant was removed, the sediment was then redispersed in a supersaturated sodium chloride solution, by gently pipetting out the clusters multiple times. This lead to breaking of the clusters to doublets which is the least stable aggregate formed out of the big clusters. At this time the outer PEG layer precipitate out and form a thin film around the microspheres. The gel between the proximal region, which is far away from the boundary layer still remain in the gel state. Redispersing the microspheres in fresh water and breaking the doublets and labeling them lead to formation of the protein patch only at the proximal region while the remaining area is adsorbed with the PEG layer.

In view of the many possible embodiments to which the principles of the disclosed methods and compositions may be applied, it should be recognized that the illustrated embodiments are only preferred examples of the invention and should not be taken as limiting the scope of the invention.

What is claimed is:

1. A method for making microparticles having an exterior surface, comprising:
    preparing a self-assembled arrangement of individual microparticles;
    contacting the self-assembled microparticles with a patch-forming agent resulting in a microparticle/patch-forming agent assembly having proximal regions between adjacent microparticles and/or proximal regions between a microparticle and another substrate, wherein the patch-forming agent is present in the proximal region;
    condensing the patch-forming agent to form a microparticle/condensed patch-forming agent assembly; and
    subsequently separating individual microparticles from the microparticle/condensed patch-forming agent assembly such that a pattern of a plurality of discrete patches of patch-forming agent are formed on the exterior surfaces of the individual microparticles at the proximal regions.

2. The method of claim 1, wherein the condensing of the patch-forming agent comprises solidifying the microparticle/patch-forming agent assembly.

3. The method of claim 2, wherein the method comprises separating the microparticles from the solidified microparticle/patch-forming agent assembly.

4. The method of claim 1, wherein the patch-forming agent is a polymer precursor and the condensing of the patch-forming agent comprises polymerizing the polymer precursor.

5. The method of claim 4, wherein the polymer precursor is selected from a monomer, oligomer, crosslinkable polymer, or a mixture thereof.

6. The method of claim 1, wherein the patch-forming agent is in the form of a fluid and condensing of the patch-forming agent comprises drying the patch-forming agent fluid.

7. The method of claim 1, wherein the patch-forming agent is selected from a polymer, a polymer precursor, a salt, a carbohydrate, a lipid, or a mixture thereof.

8. The method of claim 1, wherein the contacting of the self-assembled microparticles with a patch-forming agent comprises forming a mixture of the microparticles and the patch-forming agent.

9. The method of claim 1, wherein the patch-forming agent is included in a liquid composition that also includes a liquid carrier, and contacting of the self-assembled microparticles with a patch-forming agent comprises forming a liquid suspension of the microparticles in the liquid patch-forming agent carrier.

10. The method of claim 1, wherein the contacting of the self-assembled microparticles with a patch-forming agent fluid does not disturb the arrangement of the microparticles.

11. The method of claim 1, wherein the preparing of the self-assembled arrangement of microparticles comprises initially forming a well-shaped structure of microparticles disposed on a substrate and subsequently introducing additional microparticles into the well-shaped structure to form a colloidal crystal structure.

12. The method of claim 1, wherein the method further comprises differentially labeling the patch areas and the non-patch areas on the exterior surfaces of the microparticles.

13. The method of claim 12, wherein the differential labeling comprises binding a first material to the exterior surfaces of the microparticles after formation of the patches and subsequently removing the patches to expose unlabeled areas on the exterior surfaces of the microparticles.

14. The method of claim 13, further comprising binding a second material to the expose unlabeled areas on the exterior surfaces of the microparticles.

15. The method of claim 14 wherein the first material and/or the second material comprises a polypeptide.

16. The method of claim 15, wherein the polypeptide is a protein.

17. The method of claim 12, wherein the differential labeling comprises binding a first material to the patches and binding a second material to non-patch areas.

18. The method of claim 1, wherein the condensation forms a scaffold that includes the self-assembled arrangement of microparticles and the patches disposed only at the proximal regions between adjacent microparticles and there is no patch-forming agent disposed in interstitial spaces between the microparticles.

19. The method of claim 18, wherein the method comprises separating the microparticles from the scaffold.

20. The method of claim 18, wherein the method further comprises differentially labeling the patch areas and the non-patch areas on the exterior surfaces of the microparticles by introducing a labeling material into the scaffold.

21. The method of claim 1, wherein the arrangement of the microparticles determines the resulting pattern of patches.

22. The method of claim 1, wherein the microparticles are microspheres.

23. The method of claim 1, wherein the microparticle/patch-forming assembly has proximal regions between adjacent microparticles.

24. The method of claim 1, wherein the another substrate defines a surface upon which the microparticles are arranged.

25. The method of claim 1, wherein the contacting of the self-assembled microparticles with a patch-forming agent fluid comprises introducing the patch-forming agent into the proximal region via capillary action.

26. The method of claim 1, wherein the patches are formed only at the proximal regions.

27. The method of claim 1, wherein the patches have an exposed surface.

28. The method of claim 1, wherein the separated individual microparticles having the pattern of a plurality of discrete patches of patch-forming agent formed on the exterior surfaces are free-standing microparticles.

\* \* \* \* \*